UNITED STATES PATENT OFFICE.

JOSEPH M. SCHUTZ, OF MINNEAPOLIS, MINNESOTA.

DISINFECTING COMPOUND AND PROCESS OF MAKING.

997,514. Specification of Letters Patent. Patented July 11, 1911.

No Drawing. Application filed August 14, 1909. Serial No. 512,846.

*To all whom it may concern:*

Be it known that I, JOSEPH M. SCHUTZ, a citizen of the United States, and a resident of Minneapolis, Hennepin county, Minnesota, have invented new and useful Improvements in Disinfecting Compounds and Processes of Making the Same, of which the following is a full, true, and exact specification.

My invention relates to disinfecting compounds and has special reference to an improved quick burning sulfurous compound and a novel process of manufacturing the same.

The object of my invention is to provide a compound which when ignited will burn freely and will rapidly throw off or evolve a large volume of sulfurous acid fumes and vapors. Such fumes are of well known disinfecting and germicidal value in the destruction of bacteria, fungi, vermin and insects.

My invention consists in a porous, foraminous compound preferably made up of substantially equal quantities of uniformly admixed and fused or sintered sulfur and coke, characterized by a considerable proportion of occluded water.

In making this compound I preferably use crude brimstone, which is considerably cheaper than refined sulfur. The carbonaceous ingredient of the compound is coke which contains a considerable quantity of water, such as gas house and oven coke.

The first step of my novel process consists in melting the sulfur or brimstone in a suitable vessel by applying heat thereto. This having been accomplished, I stir into, and thoroughly admix with, the molten sulfur a substantially equal quantity of crushed or pulverized coke, maintaining the requisite temperature and continuing the stirring or agitation until a uniform molten or plastic admixture or mass results. As a final step I pour the molten mixture or compound into cold water, preferably a running stream of water, whereby and wherein the compound is cooled, and is roughly granulated and broken up into chunks or pieces. During this cooling step of the process, the compound is further charged with water. The large granules or pieces, of many sizes, do not adhere or pack together. They closely resemble furnace cinders, being of ragged, porous structure and non-fibrous in appearance. The color of the compound is generally a dark bluish-gray.

The porosity or cellular formation of the compound insures rapid and free combustion of its sulfur content and when once lighted the compound burns until the sulfur is completely consumed, the residue of combustion being carbon. During combustion the aqueous content of the compound is vaporized and combines with the sulfur dioxid vapors; and a large proportion of sulfurous acid is produced.

Various modifications of the herein described compound and certain refinements of the herein described process will readily suggest themselves to one who is skilled in the art. This being true, I do not confine my invention to the precise constituents or proportions of sulfur, carbon and water which go to make up my novel compound in its preferred form; nor do I limit the invention to the specific steps herein set forth as constituting my novel process.

Having thus described my invention, I claim as new and desire to secure by Letters Patent:

1. The herein described disinfecting compound in the form of cinderous porous lumps composed of substantially equal parts of agglomerated sulfur and coke, occluding a portion of water.

2. The herein described disinfecting compound in the form of cinderous porous lumps composed of substantially equal parts of agglomerated sulfur and pulverized coke containing a portion of absorbed water.

3. The herein described improvement in the art of manufacturing disinfecting compounds which consists in melting sulfur in a suitable receptacle, then admixing therewith a substantially equal quantity of pulverized carbonaceous material and then suddenly cooling and breaking up the molten mass by pouring into water, thereby producing many small cinderous lumps of the compound.

4. The herein described improvement in the art of manufacturing disinfecting compounds that consists in reducing crude brimstone to a molten state, then admixing therewith, while still molten, a quantity of pulverized coke, maintaining the molten character of the mixture and then suddenly cooling and breaking up the resulting substance by pouring the same into a cooling liquid, substantially as described.

In testimony whereof, I have hereunto set my hand, this 11 day of August, 1909, in the presence of two subscribing witnesses.

JOSEPH M. SCHUTZ.

Witnesses:
L. K. EATON,
MILLIE DORUM.

Copies of this patent may be obtained for five cents each, by addressing the "Commissioner of Patents, Washington, D. C."